United States Patent [19]

Nakane et al.

[11] Patent Number: 4,928,728

[45] Date of Patent: May 29, 1990

[54] GAS SHUTOFF APPARATUS

[75] Inventors: Shinichi Nakane, Yamatokouriyama; Takashi Uno, Nara; Hiroshi Horii, Kashihara; Shinyo Kato, Tokyo; Mitsuo Namba, Machida; Reppei Uematsu, Yokohama, all of Japan

[73] Assignees: Matsushita Electric Industrial Co., Ltd., Kadoma; The High Pressure Gas Safety Institute of Japan, Tokyo, both of Japan

[21] Appl. No.: 308,212

[22] Filed: Feb. 9, 1989

[30] Foreign Application Priority Data

Feb. 10, 1988 [JP] Japan ................................. 63-29242
Feb. 10, 1988 [JP] Japan ................................. 63-29243
Nov. 25, 1988 [JP] Japan ................................. 63-298702

[51] Int. Cl.⁵ ............................................. G05D 7/06
[52] U.S. Cl. ................................. 137/486; 137/487.5; 137/460; 137/624.11
[58] Field of Search ................. 137/486, 487.5, 459, 137/460, 624.11

[56] References Cited

U.S. PATENT DOCUMENTS 3,776,249  12/1973  Wailes ............................. 137/486 X
4,223,692  9/1980   Perry .............................. 137/460 X
4,519,955  5/1985   Meyer ............................. 137/460 X

FOREIGN PATENT DOCUMENTS 63-108118  5/1988  Japan .

Primary Examiner—Alan Cohan
Attorney, Agent, or Firm—Cushman, Darby & Cushman

[57] ABSTRACT

A flow rate of gas is measured with a flow rate measurement means and a "consumption state" defined with a combination of maximum flow rate, the total amount and a consumption time of the gas is therefor detected. The consumption state is compared with a reference consumption condition which is represented by a predetermined consumption state, and when the consumption state exceeds the reference consumption condition, supply of the gas is interrupted. Furthermore, a monitor range of the consumption state is formed, and when a consumption state is present in the monitor range, the reference consumption condition is changed.

5 Claims, 14 Drawing Sheets x: Measured comsumption state

GAS SHUTOFF APPARATUS

FIELD OF THE INVENTION AND RELATED ART STATEMENT

1. Field of the Invention

The present invention relates generally to a gas shutoff apparatus for a gas equipment using a town gas or liquefied petroleum gas, and more particularly to a gas shutoff apparatus for preventing gas explosions or gas poisoning due to gas escaping a gas supply tube or gas equipment.

2. Description of the Related Art

The greater part of gas accidents are caused by escape of unburned gas such as town gas or liquefied petroleum gas (hereinafter is referred to as the gas). The gas escapes when a main cock for supplying the gas to a gas equipment is opened without burning of the gas, when unexpected disconnection of a rubber tube supplying the gas to the gas equipment occurs or the rubber tube has cracks thereon, for example. In order to prevent escape of the gas in the prior art, an automatic shutoff valve, a reinforced tube, an alarm to detect the escaped gas and an automatic gas shutoff system which is connected to the alarm etc. are used.

However, the automatic shutoff valve usually cannot be activated under a small flow rate of the escaping gas, and the escape of the gas cannot be interrupted. On the other hand, in the gas alarm, it merely generates an alarm, so that if a person is absent from there, the alarm is not noticed. Thus dangerous escape of the gas cannot be interrupted. Furthermore, with regard to the automatic gas shutoff system connected to the alarm, implementing such system to existing houses is difficult owing to its high cost and necessity of connecting construction. Moreover, the above-mentioned conventional countermeasures are not effective to eliminate the occurrence of gas suicide, which is liable to cause a gas explosion.

In order to improve these defects, a gas shutoff apparatus for preventing the gas explosion or gas suicide has recently been developed for household use. In such gas shutoff apparatus, a flow rate of the gas is detected, and when a total amount of the gas per a predetermined time period exceeds a predetermined value, occurrence of an abnormal state is detected and supply of the gas is interrupted (shutoff function at excess of a predetermined total amount of gas). Also, when the flow rate greatly increases and is significantly larger than a predetermined flow rate, an abnormal state is detected, and supply of the gas is interrupted (shutoff function at excess of a predetermined limit of flow rate). Moreover, when the gas equipment continuously consumes the gas without variation of a flow rate and the continuous time of gas consumption with the flow rate exceeds a predetermined time period which is determined responding to an average normal consumption rate thereof, the above status is detected as an abnormal state, and supply of the gas is interrupted (gas shutoff function at excess of a predetermined continuous use time).

The respective predetermined reference values of these "total amount of the gas", "limit of flow rate" and "continuous use time" are set, for example, corresponding to a rated measurement capacity in the individual consumer. A gas shutoff apparatus embodying the above-mentioned method is disclosed in the Japanese published unexamined patent application Sho 63-108118, for example.

FIG. 1 is a block diagram of the gas shutoff apparatus of Sho No. 63-108118. Referring to FIG. 1, a flow rate measurement means 3 detects a flow rate of the gas flowing from a gas supply tube to a gas equipment and generates a flow rate signal corresponding to the flow rate. A consumption state detection means 6 detects "a consumption state" which is represented by combination of a maximum flow rate, a total amount and a consumption time of the gas on the basis of the flow rate signal.

A "reference consumption condition" is represented by combinations of reference values of the maximum flow rate, the total amount and the consumption time of the gas. An initial consumption condition is determined by an initial consumption condition setting means 7. Then the initial consumption condition is set in a changing means 12 of reference consumption condition for starting operation of the gas shutoff apparatus.

Data of the reference consumption condition of the changing means 12 of reference consumption condition is applied to a consumption state judging means 8. On the other hand, data of the consumption state detection means 6 is also applied to the consumption state judging means 8. Then, the data of the consumption state detecting means 6 is compared with the data of the reference consumption condition in the consumption state judging means 8. When the consumption state exceeds the reference consumption condition, a shutoff signal for closing a valve is output.

A timer 9 measures a predetermined time period by a starting signal from a starting signal generating means 10. A consumption state memory 11 stores the consumption state on the basis of the flow rate signal from the flow rate measurement means 3 during an operation time period of the timer 9. The time period is selected two weeks or one month, for example. Then an amount of the gas consumption, maximum flow rates and a continuous time of the gas consumption which are measured by the flow rate signal of the flow rate measurement means 3 are stored in the consumption state memory 11 from start of the timer 9. A combination of the amount of gas consumption, the maximum flow rate and the continuous consumption time is called as "a gas consumption pattern". The gas consumption pattern represents character of a consumer in gas consumption. The consumption state of the gas is concrete representation of the gas consumption pattern. Stored data in the consumption state memory 11 represents the consumption state. The maximum data of the consumption state is applied to the changing means 12 of the reference consumption condition and is compared with the data of the initial consumption condition set in the initial consumption state setting means 7, after finding of the operation of the timer 9. Subsequently, in case that the maximum data is different from the data of the initial consumption condition, the maximum data is set in the changing means 12 of consumption state as a new reference consumption condition. After once setting the new reference consumption condition, a consumption state is compared with the new reference consumption condition.

In the above-mentioned prior art, in case that a new gas equipment is introduced in the consumer after the new reference consumption condition has set, for example, the gas consumption pattern of the consumer varies. Thus normal operation of the gas shutoff apparatus cannot be expected.

OBJECT AND SUMMARY OF THE INVENTION

An object of the present invention is to provide a gas shutoff apparatus in which a consumption state of gas in each gas-consumer is measured every predetermined time period and is compared with a reference consumption condition. When the consumption state has varied, the reference consumption condition is changed correspondingly to the varied consumption state.

The gas shutoff apparatus in accordance with the present invention comprises:

flow rate measurement means for generating a flow rate signal corresponding to a flow rate of gas in a gas supply line, consumption state detection means for detecting a consumption state shown by the flow rate and a consumption time of the gas on the basis of the flow rate signal, initial consumption condition setting means comprising a memory for setting a reference consumption condition as an initial condition, consumption state judging means comprising means for comparing the detected consumption state with the reference consumption condition and for generating a gas shutoff signal in excess of the consumption state from the reference consumption condition, a first timer for measuring a first predetermined time period, starting signal generating means for starting operation of the first timer, consumption state memory for storing a consumption state during a time period of operation of the first timer and comprising the step for calculating a consumption condition on the basis of the stored consumption state, means for changing the reference consumption condition, means for computing a monitor range for forming a monitor range of the consumption state, a second timer for measuring a second predetermined time period, means for computing provisional reference consumption condition and setting the provisional reference consumption condition into the means for changing reference consumption condition on the basis of an output of the consumption state detection means, a consumption state presence detector for detecting an occurrence of a consumption state which exists in the monitor range for outputting a signal for starting operation of the second timer at the occurrence of the consumption state, for storing a consumption state which is present in the monitor range during operation of the second timer, and for calculating a reference consumption condition on the basis of the stored consumption state, and shutoff means for interrupting the gas supply by reception of the shutoff signal.

According to the present invention, an actual consumption state is measured during a time period determined by the first timer, and a first reference consumption condition is set on the basis of the data of the actual consumption state after finish of operation of the first timer. Then a monitor range is set, and a second timer is started. During operation of the second timer, when a consumption state exists in the monitor range, the first reference consumption condition is temporarily replaced with another reference consumption condition.

DESCRIPTION OF THE PREFERRED EMBODIMENT

Figure 1:
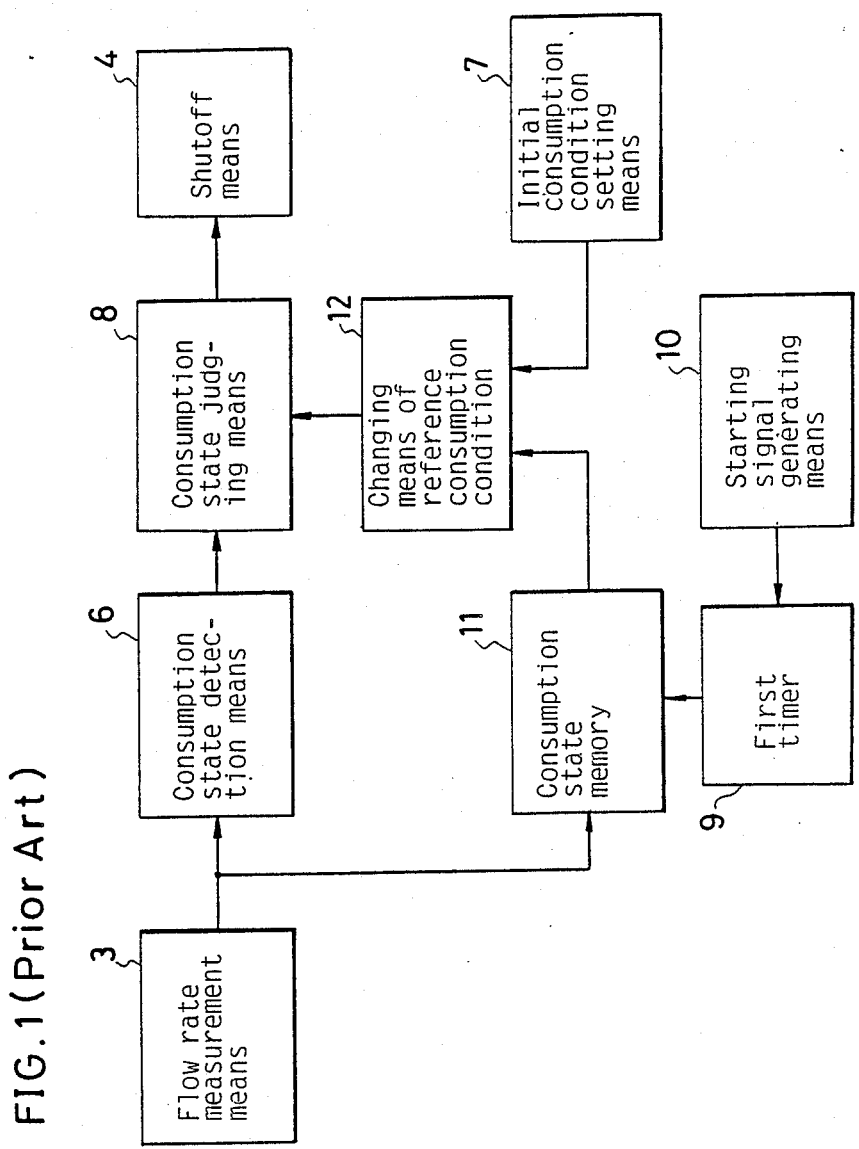
FIG. 1 is the block diagram of the gas shutoff apparatus in the prior art.
Figure 2:
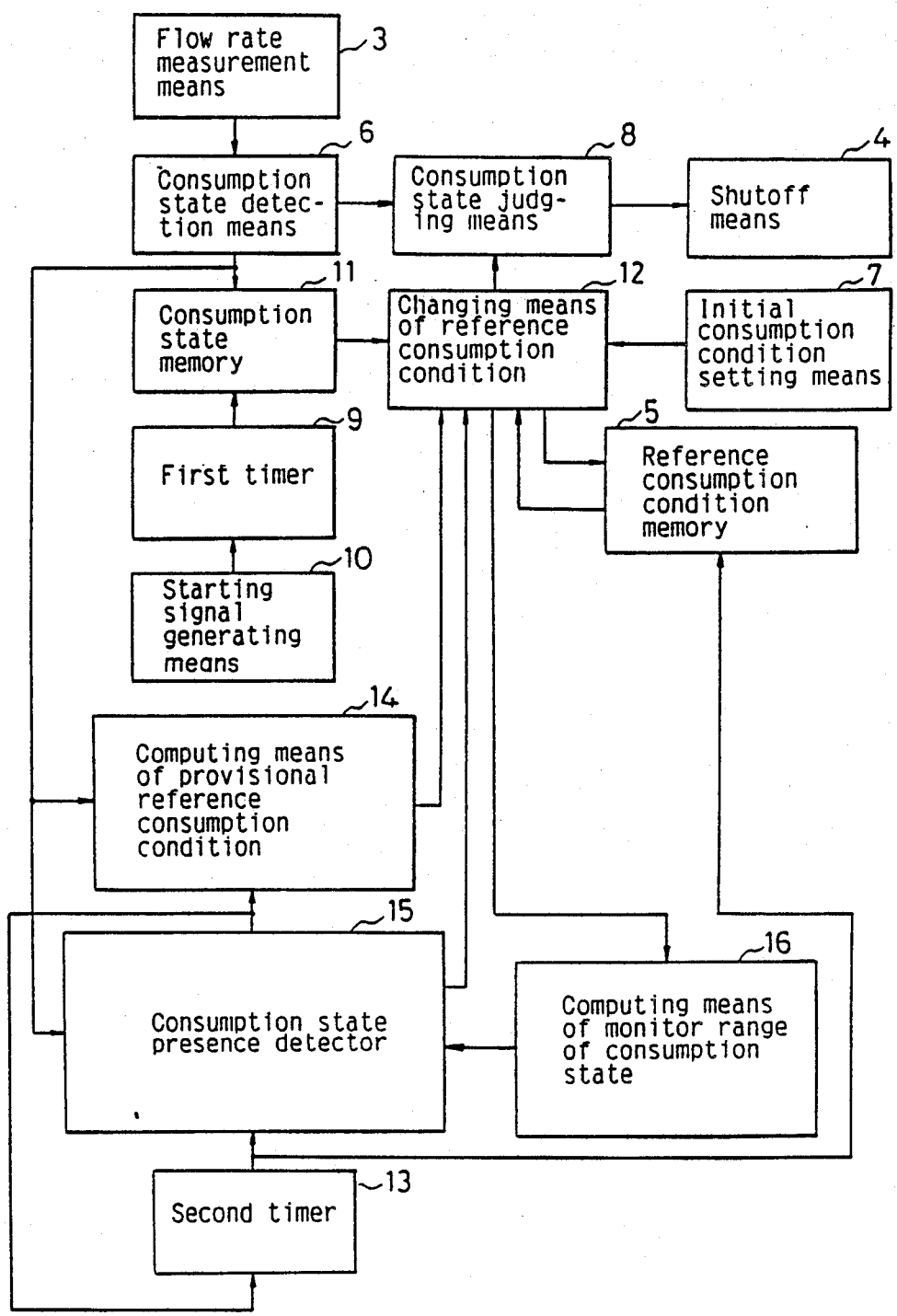
FIG. 2 is a block diagram of a gas shutoff apparatus of a first embodiment in accordance with the present invention.

FIG. 2 is a block diagram of a gas shutoff apparatus of a first embodiment in the present invention. Referring to FIG. 2, a flow rate measurement means 3 detects a flow rate of the gas flowing from a gas supply tube to a gas equipment, and generates a flow rate signal corresponding to the flow rate. A consumption state detection means 6 detects "a consumption state" of the gas which is defined as combination of physical values on gas consumption, or elements such as maximum flow rate, total amount and consumption time of the gas in a predetermined time period, for example. Alternatively, the consumption state may be defined as combination of the elements of a flow rate, the flow rate of a gas equipment which is maximum in gas consumption and a total amount of the gas in a predetermined time period.

A "reference consumption condition" is defined as a condition for examining the consumption state and is represented by a set of respective reference values of the maximum flow rate, the total amount and the consumption time of the gas, for example. An initial consumption condition is determined by an initial consumption condition setting means 7. Then the initial consumption condition is set in a changing means 12 of reference consumption condition for starting operation of the gas shutoff apparatus.

Data of the reference consumption condition of the changing means 12 for reference consumption condition is applied to a consumption state judging means 8. A consumption state detected by the consumption state detection means 6 is applied to the consumption state judging means 8. In the consumption state judging means 8, the maximum flow rate, the total amount and the consumption time of the gas in the consumption state are compared with the reference values of the maximum flow rate, the total amount and the consumption time of the gas, respectively. Then, when at least one element of the consumption state exceeds the reference value of the corresponding element of the consumption condition, a shutoff signal for closing a valve is output to a shutoff means 4. Though data processing of the consumption state of consumption condition is accomplished with respect to the respective three elements, hereafter, the wordings of the "consumption state" or the "reference consumption condition" is used to imply only one element of the above-mentioned three ones for the simplicity of description.

A first timer 9 measures a predetermined time period by a starting signal from a starting signal generating means 10. A consumption state memory 11 stores the consumption state on the basis of the flow rate signal from the flow rate measurement means 3 during the time period of the first timer 9. The time period is selected two weeks or one month, for example. Then the consumption state represented by an amount of the gas consumption, maximum flow rates and a continuous time of the gas consumption which are measured by the flow rate signal is detected and is stored in the consumption state memory 11 from start of the first timer 9.

A computing means 16 for calculating "monitor range" of the consumption state generates a reference consumption condition on the basis of the reference consumption condition set in the changing means 12. The generated reference consumption condition is lower than the reference consumption condition set in the changing means 12, thus the monitor range is formed between these two reference consumption conditions. The data of the monitor range is stored in a memory of the computing means 16.

The data of the monitor range is applied to a consumption state presence detector 15. The consumption state presence detector 15 detects presence of a consumption state in the monitor range, and a number of presence of the consumption state in the monitor range is counted during an operating time period of the second timer 13 and is stored in a memory thereof. The second timer 13 is started by first occurrence of presence of the consumption state in the monitor range. The consumption state presence detector 15 also generates data of a new reference consumption condition on the basis of the consumption state which is present in the monitor range.

A computing means of a provisional reference consumption condition 14 generates data of a provisional reference consumption condition by multiplying data from the consumption state detection means 6 by a predetermined constant value. Then the provisional reference consumption condition is set into the changing means 12 in response to the input signal from the consumption state presence detector 15. In the above-mentioned operation, the reference consumption condition set in the changing means 12 is temporarily stored in a reference consumption condition memory 5.

Figure 3:
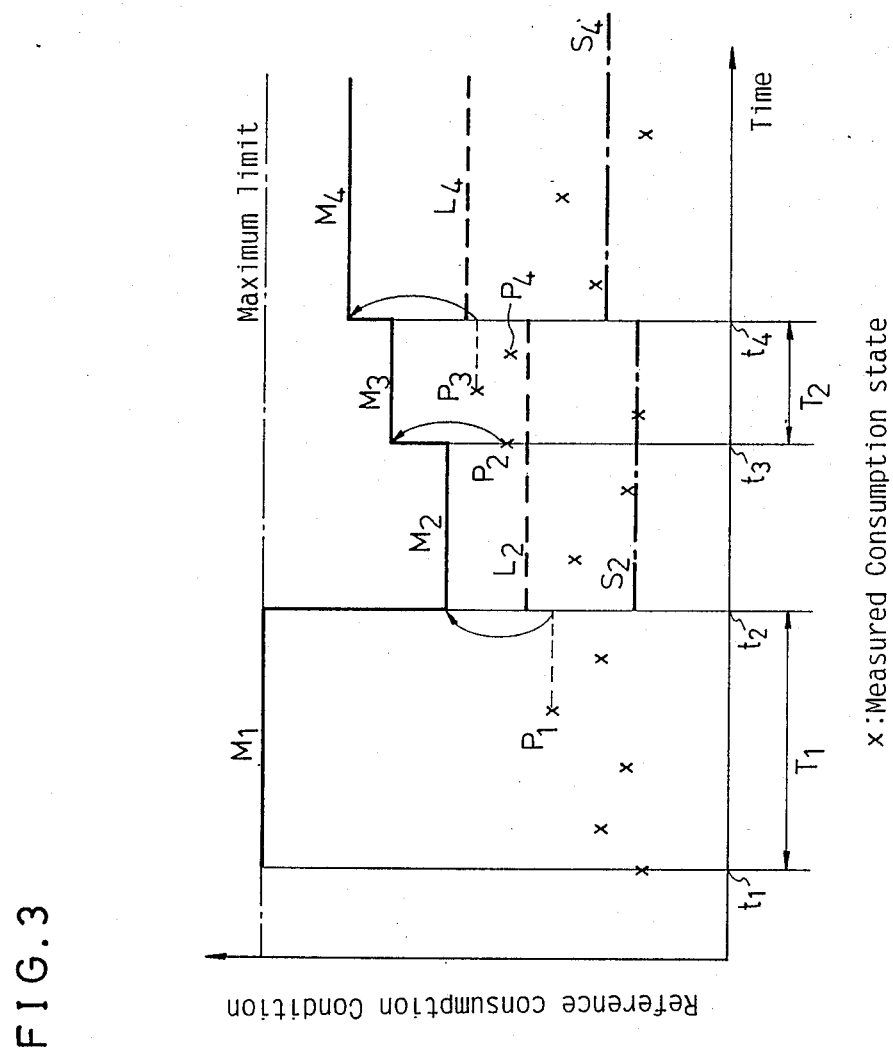
FIG. 3 is a graph of a reference consumption condition in the first embodiment.
Figure 4:
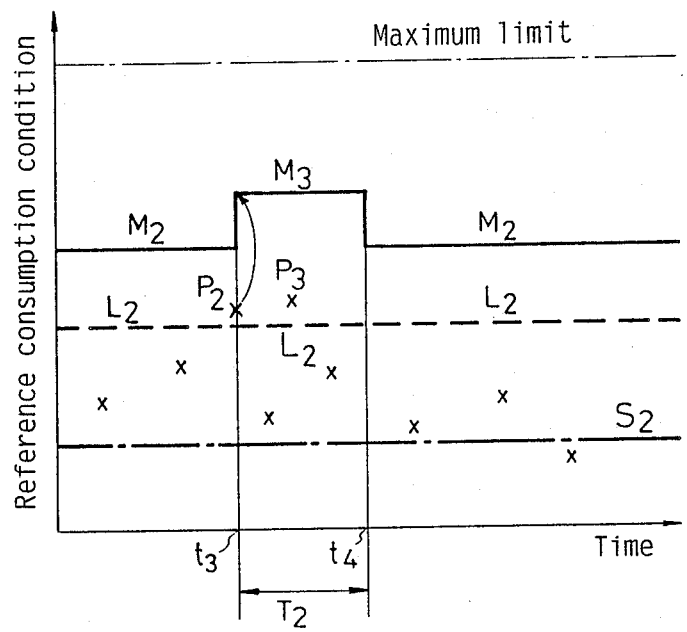
FIG. 4 is other graph of the reference consumption condition in the first embodiment.

FIG. 3 and FIG. 4 are graphs showing operation of the first embodiment. Referring to both the graphs the abscissa is graduated by time, and the ordinate is graduated by a reference consumption condition which is a reference value of the consumption state. Cross marks designate levels of measured consumption states. A maximum limit $M_1$ of a consumption condition is designated by an alternate long and short dash line.

A time period $T_1$ from a time $t_1$ to a time $t_2$ is an operation time of the first timer 9. The maximum consumption state $P_1$ of plural consumption states which are measured in the time period $T_1$ is selected, and a reference consumption condition $M_2$ is calculated by multiplying the maximum consumption state $P_1$ by a safety factor k (for example, k=1.5) in the consumption state memory 11. Namely, the reference consumption condition in the time period $T_1$ is equal to the maximum reference consumption condition $M_1$, and which is compared with the reference consumption condition $M_2$ in the changing means 12 at the time $t_2$. Then the lower reference consumption condition $M_2$ is set in the changing means 12 as a new reference consumption condition. Moreover, a reference consumption condition $L_2$ which is lower than the reference consumption condition $M_2$ is computed by computing means 16, and a monitor range of the consumption state is formed between the reference consumption conditions $L_2$ and $M_2$. In the above-mentioned status, when a consumption state exceeds the reference consumption condition $M_2$, the consumption state judging means 8 detects abnormal state and outputs a signal for activating the shutoff means 4.

At a time $t_3$, a consumption state $P_2$ exceeds the reference consumption condition $L_2$ and is present in the monitor range, and thereby operation of the second timer 13 is started. Subsequently, a reference consumption condition $M_3$ is calculated by multiplying the consumption state $P_2$ by the safety factor k, and the reference consumption condition $M_3$ is temporarily set in the changing means 12. On the other hand, the reference consumption condition $M_2$ is stored in the reference consumption state memory 5 in order to preserve it. The time period $T_2$ between the time $t_3$ and a time $t_4$ is the operation time of the second timer 13. The monitor range is formed between the reference consumption condition $L_2$ and the reference consumption condition $M_3$. In the time period $T_2$, consumption states $p_3$ and $p_4$ are in the monitor range. Consequently, three consumption states $p_2$, $p_3$ and $p_4$ exist with the monitor range during the time period $T_2$. In this status, a reference consumption condition $M_4$ is calculated by multiplying the maximum consumption state $p_3$ by the safety factor k at the time of finish of operation of the second timer 13, and the reference consumption condition $M_4$ is set in the changing means 12. Subsequently, in order to provide a new monitor range, a reference consumption condition $L_4$ is calculated. Similarly, the above-mentioned operation of the gas shut-off apparatus is continued after the time $t_4$.

In the above-mentioned process, in case that three consumption states or more are in the monitor range, the reference consumption condition is changed. The number of the consumption state in the monitor range is freely selected in response to shutoff condition of the gas shutoff apparatus. Furthermore, the time period $T_2$ can be divided into several time periods, and condition for changing the reference consumption can be determined by the number of the consumption state which exist in the monitor range during each divided time period. For example, plural consumption states which exist in the monitor range during a divided time period are regarded as one consumption state, and when a consumption state exists in the monitor range during each divided time period, the reference consumption condition in the changing means 12 is replaced with a new reference consumption condition. In the other method, the new reference consumption condition can be set when the condition for replacing is satisfied before finish of the time period $T_2$.

FIG. 4 is a graph showing other operation of the first embodiment. In the operation, only two consumption states $p_2$ and $p_3$ are within the monitor range during the time period $T_2$, thus the condition for replacing the reference consumption condition is not satisfied. Then, when operation of the second timer 13 has finished, the provisional reference consumption condition $M_3$ is replaced with the preceding consumption state $M_2$ which is stored in the reference consumption state memory 5. Accordingly, the lower reference consumption condition of the monitor range is identical with the reference consumption condition $L_2$.

In the above-mentioned operation, though the reference consumption condition which is calculated on the basis of a measured consumption state is employed as the upper reference consumption condition of the monitor range, the upper reference consumption condition can be selected from predetermined plural reference consumption conditions in the neighborhood of and over the calculated reference consumption condition.

The lower reference consumption condition L can be calculated by multiplying the reference consumption condition M by a constant value (for example, 80% of reference consumption condition M), whereas a fixed predetermined value corresponding to the reference consumption condition M is applicable to the reference consumption condition L. The above-mentioned calculation process is accomplished by a microcomputer, for example.

Figure 5:
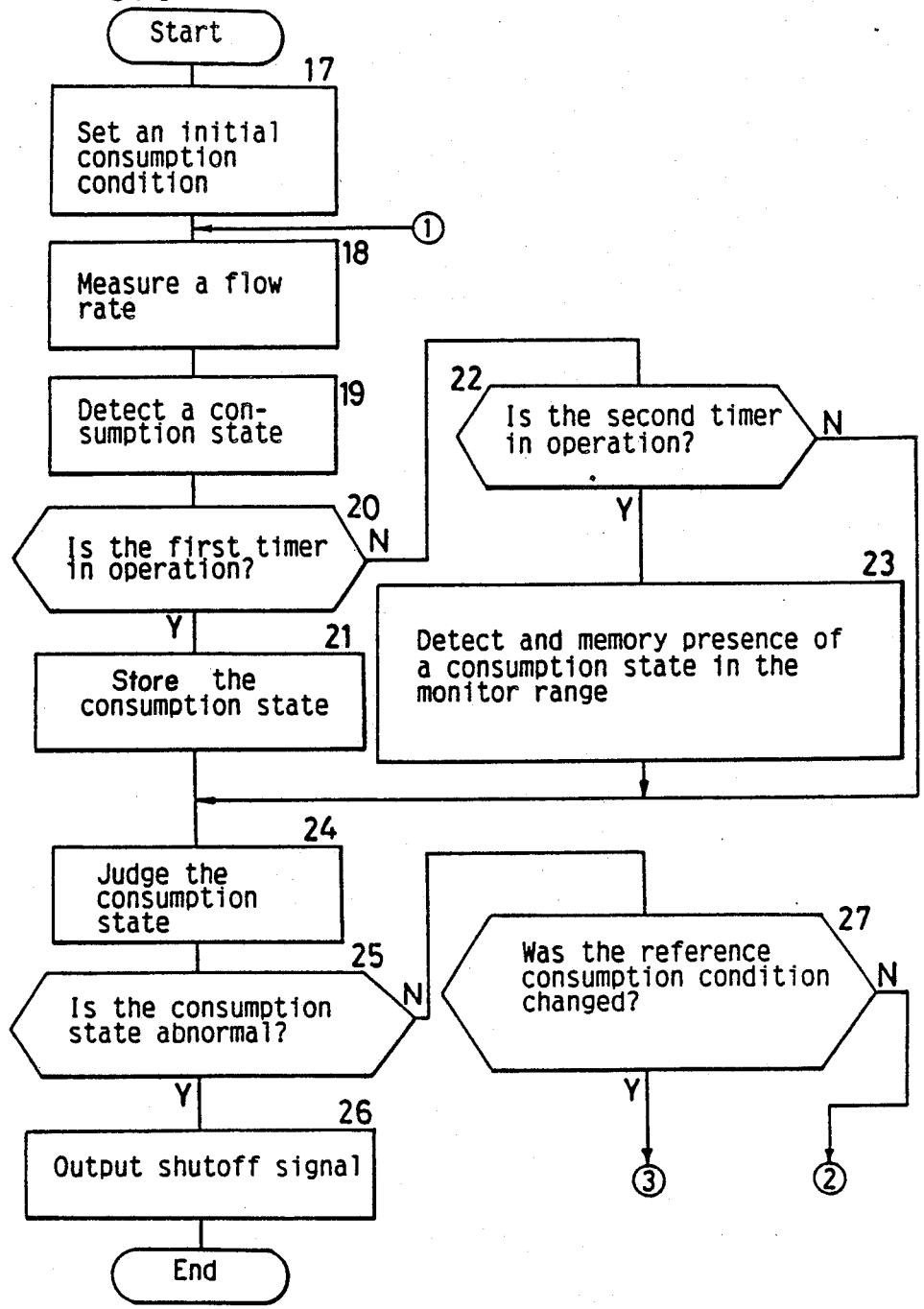
FIG. 5, FIG. 6 and FIG. 7 are flow charts in operation of the first embodiment.
Figure 6:
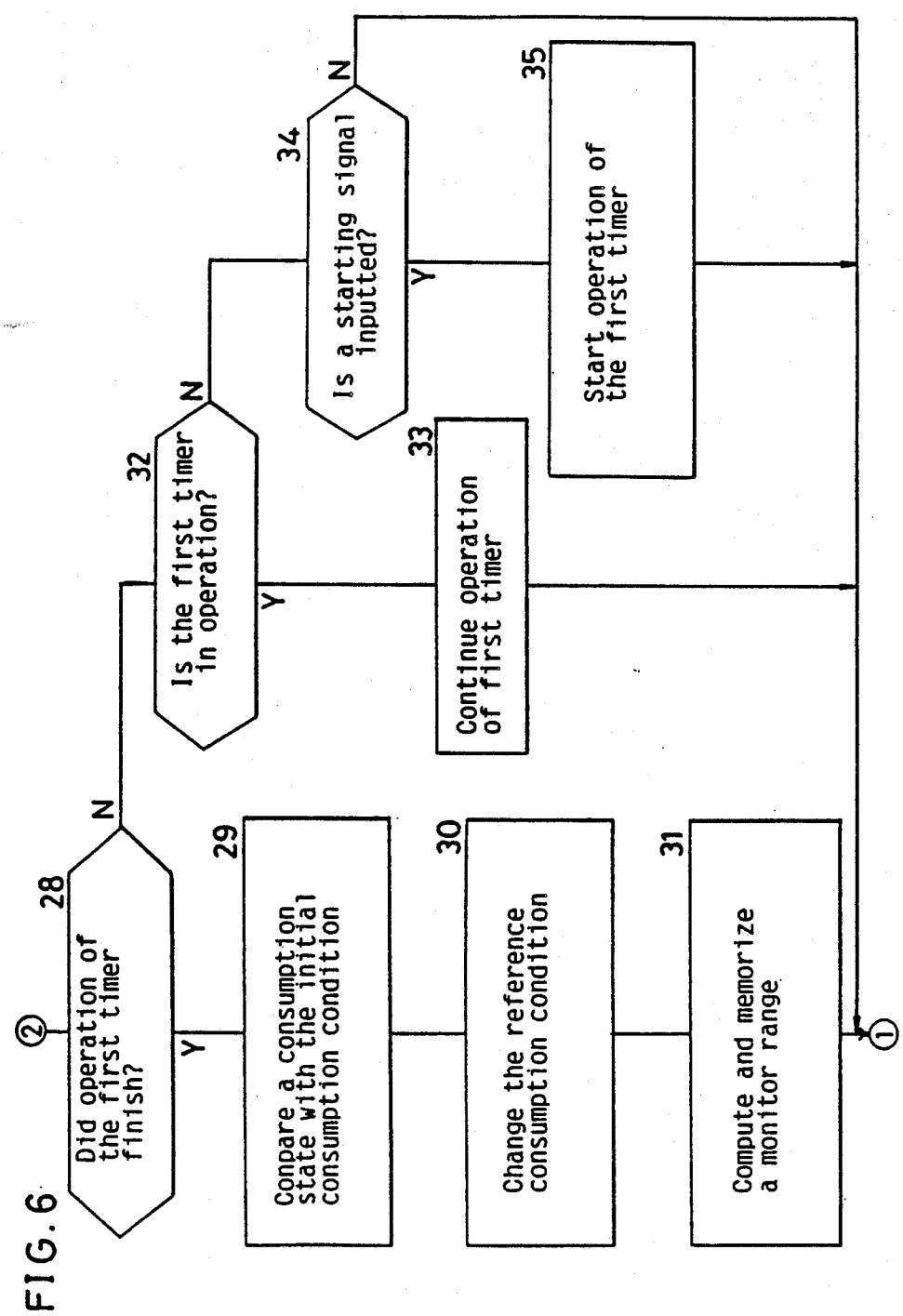
Figure 7:
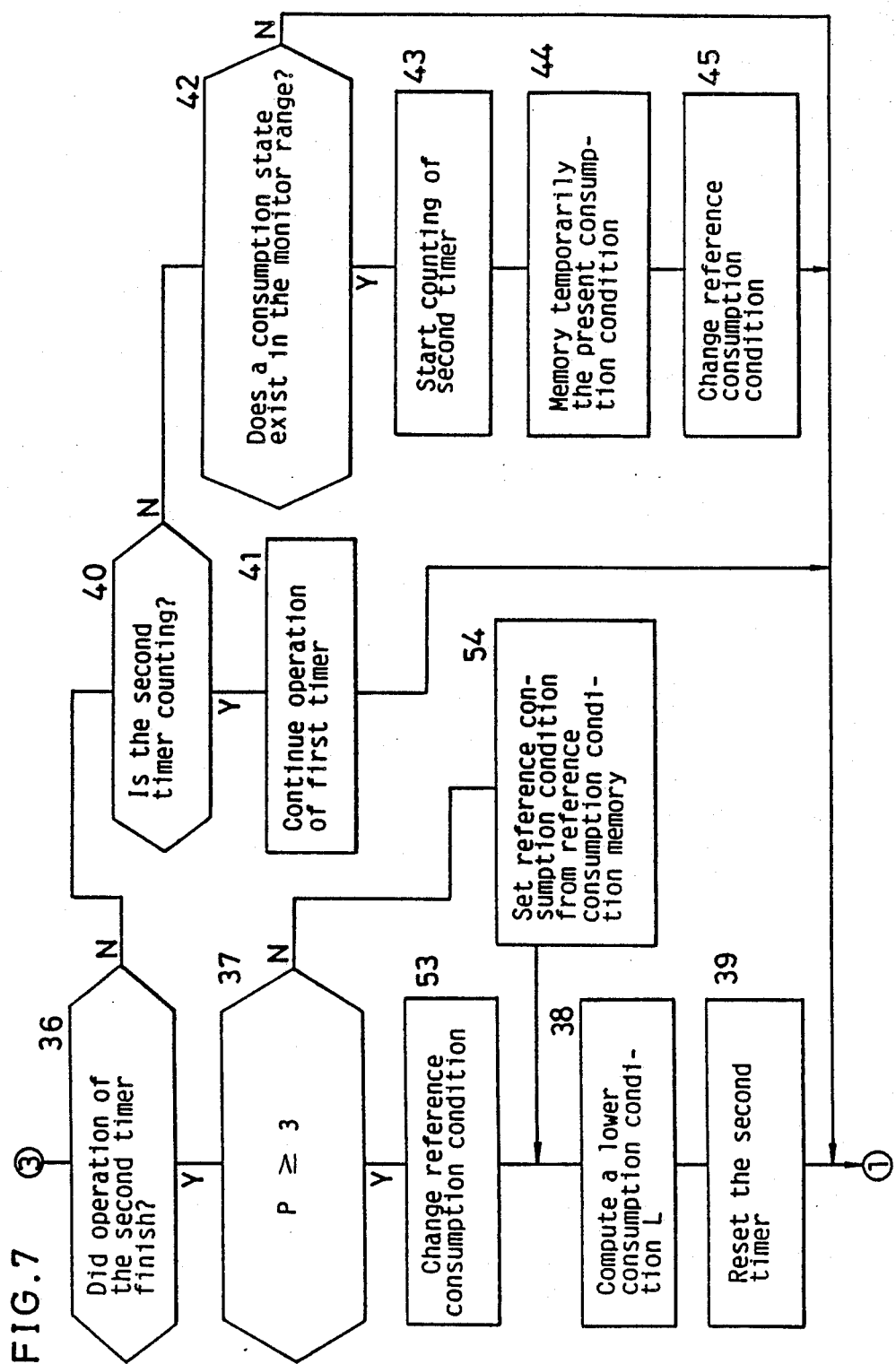

FIG. 5, FIG. 6 and FIG. 7 are flow charts of the steps of operation of the gas shutoff apparatus in the first embodiment.

Referring to FIG. 5, an initial consumption condition is set for a reference consumption condition from the initial consumption condition setting means 7 (step 17). A flow rate is measured (step 18), and a consumption state is detected on the basis of the output signal of the flow rate measurement means 3 (step 19). In a step 20, operation of the first timer 9 is examined, and when the first timer 9 is in operation, the present consumption state is detected and the maximum consumption state thereof is stored (step 21). When the first timer 9 is not in operation, operation of the second timer 13 is examined (step 22). When the second timer 13 is in operation, a consumption state which exists in the monitor range is detected and stored in the detector 15 (step 23). When the second timer 13 is not in operation, and after the steps 21 and 23, the present consumption state is compared with the reference consumption condition in the consumption state judging means 8 (steps 24 and 25). When result of judgment in the consumption state judging means 8 is abnormal, a gas shutoff signal is output (step 26). When the result of judgment is normal, it is examined whether the reference consumption condition in the changing means 12 was replaced with the output from the consumption state memory 11 (step 27). When the reference consumption condition has been replaced, the process goes to step 36 of FIG. 7. When the reference consumption condition is not replaced, the process goes to step 28 in FIG. 6.

Referring to FIG. 6, operation of the first timer 9 is examined (step 28). When the operation of the first timer 9 has finished, the initial consumption condition is compared with a consumption state from the consumption state memory 11 (step 29), and a lower one is selected for a reference consumption condition $M_2$, and the reference consumption condition $M_1$ in the changing means 12 is replaced with the low reference consumption condition $M_2$ (step 30). Then, a reference consumption condition L is calculated for forming a monitor range of a consumption state on the basis of the replaced reference consumption condition $M_2$ (step 31). On the other hand, when operation of the first timer 9 does not finish, operation of the first timer 9 is examined (step 32). When the first timer 9 is in operation, the counting operation of the first timer 9 is continued (step 33). When the first timer 9 is not in operation, occurrence of a starting signal from the starting signal generating means 10 is detected (step 34). When the starting signal has inputted, the first timer starts operation (step 35). When the starting signal is not output, and after the steps 31, 33 and 35, the process return to the step 18 in FIG. 5, and a flow rate is measured.

Referring to FIG. 7, finish of operation of the second timer 13 is examined (step 36). When the operation of the second timer finishes, it is examined that three consumption states P are in the monitor range (step 37). When three consumption states are present in the monitor range, the reference consumption condition in the changing means 12 is replaced with a consumption state from the consumption state memory 11 (step 53). On the other hand, in case that the condition in the step 37 is not satisfied, the reference consumption condition which is stored in the reference consumption state memory 5 is reset into the changing means 12 (step 54). Then, a lower reference consumption condition $L_n$ (n=1, 2, 3...) for a monitor range is calculated on the basis of the reference consumption condition set in the changing means 12 (step 38). Subsequently, the second timer 13 is reset (step 39). When operation of the second timer 13 does not finish, operation of the second timer 13 is examined (step 40). When the second timer 13 is in operation, the counting operation is continued (step 41). When the second timer is not in operation, a consumption state which is in the monitor range is detected (step 42). When a consumption state is in the monitor range (consumption state $P_2$ in FIG. 3), operation of the second timer 13 is started (step 43), and the present reference consumption condition in the changing means 12 is temporarily memorized in the reference consumption condition memory 5 (step 44). Subsequently, the reference consumption condition is replaced with a consumption condition from the computing means 14 of provisional consumption condition (step 45). On the other hand, in case that no consumption state is in the monitor range, or after the steps 39, 41 and 45, the process returns to the step 18 as shown in FIG. 5.

In the above-mentioned embodiment, the monitor range is arranged between the reference consumption condition $M_n$ (n=1, 2, 3...) and the reference consumption condition $L_n$ which is lower than the reference consumption condition M. Furthermore, a reference consumption condition $S_n$ which is lower than the reference consumption condition $L_n$ can be arranged for an additional function of the embodiment as shown in FIG. 3 and FIG. 4. In operation of such function of the gas shutoff apparatus, when a consumption state which exceeds the reference consumption condition S is not present during a predetermined time period, the process returns to start of operation. Consequently, the upper reference consumption condition $M_n$ is lowered, and the monitor range is inevitably lowered, thus a suitable monitor range is arranged corresponding to reduction of gas consumption because of reduction of a gas equipment or change of the season, for example.

As mentioned above, in the gas shutoff apparatus in accordance with the present invention, a consumption state of the gas is always monitored and is compared with a predetermined reference consumption condition. Therefore, when the consumption state exceeds the reference consumption condition because of escape of the gas or significant increase of gas consumption, the consumption state is determined to be abnormal, and the shutoff means is activated to shutoff supply of the gas. Consequently, gas explosion or gas poisoning can be prevented.

Furthermore, an actual consumption state of a consumer is measured during a predetermined time period of the first timer, and a reference consumption condition is set on the basis of the measured consumption state. Consequently, character of the consumer in gas consumption is introduced into the reference consumption condition, thus, function for preventing a gas accident is significantly improved. Moreover, in case that the consumption state of the consumer is changed by replacement of a gas equipment or purchase of a new gas equipment, the reference consumption condition is amended to an optimum reference consumption condition.

Figure 8:
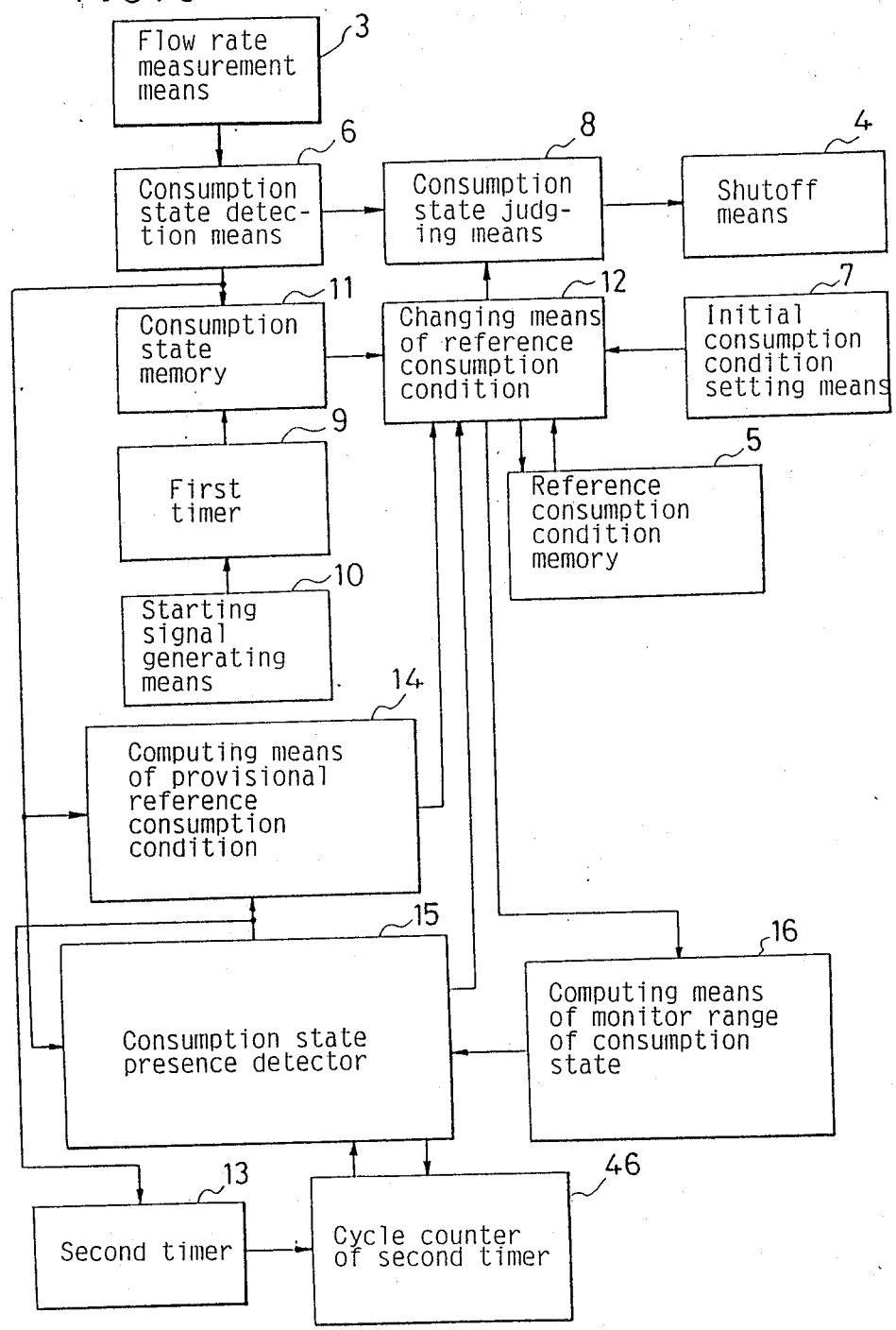
FIG. 8 is a block diagram of the gas shutoff apparatus of a second embodiment in accordance with the present invention.

FIG. 8 is a block diagram of a gas shutoff apparatus of a second embodiment, wherein elements similar to the elements of FIG. 2 are identified by like numerals. In the second embodiment, a cycle counter 46 for counting the number of operations of the second timer 13 is added into the block diagram shown in FIG. 2. Moreover, the consumption state existence detector 15 outputs a signal to restart the second timer 13 until a predetermined number of signals is output from the cycle counter 46.

Figure 9:
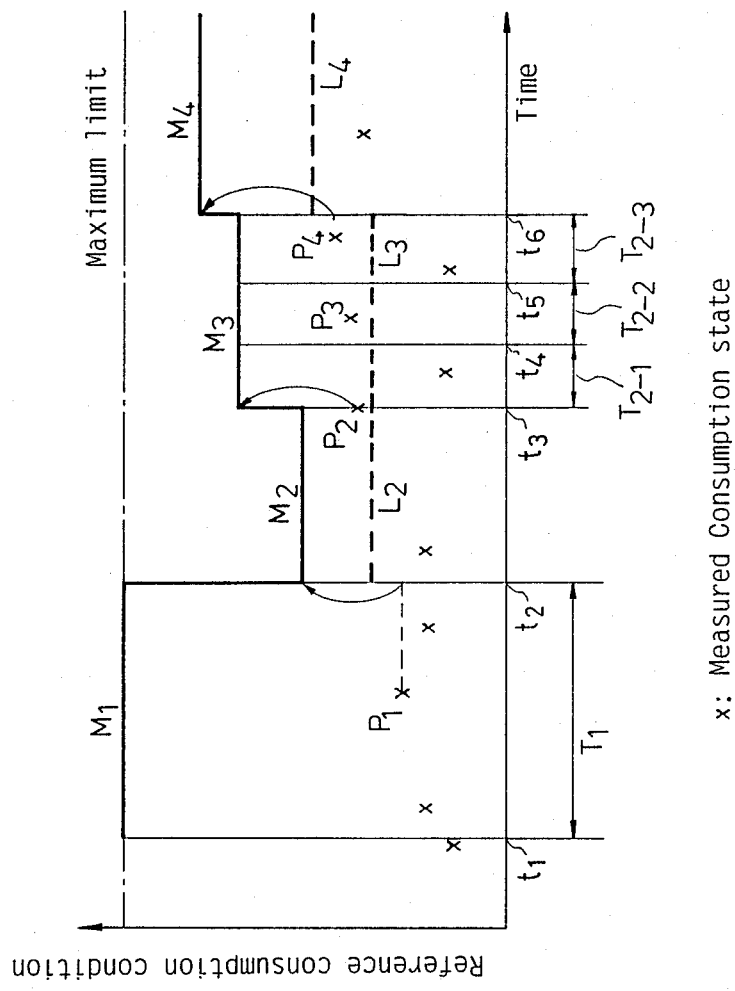
FIG. 9 is a graph of a reference consumption condition in the second embodiment.
Figure 10:
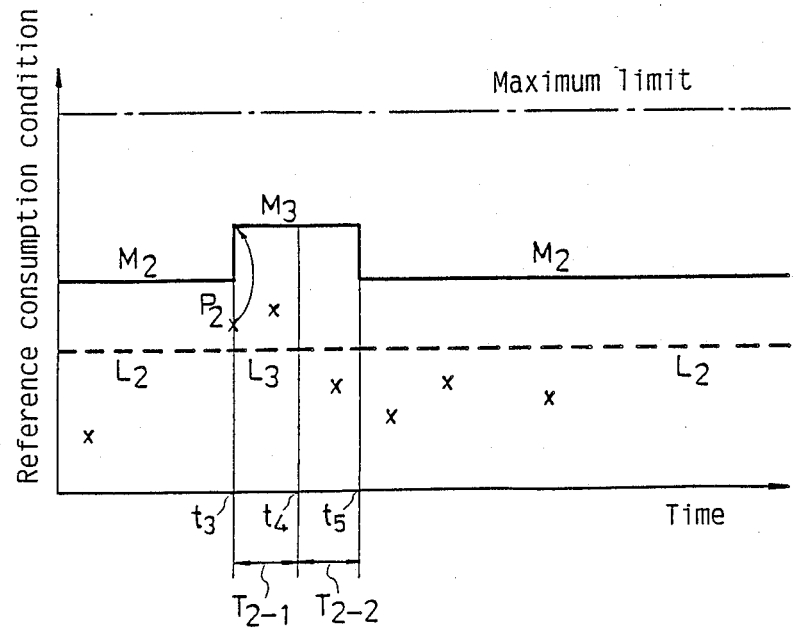
FIG. 10 is other graph of the reference consumption condition in the second embodiment.

Operation of the second embodiment is elucidated in reference with FIGS. 9 and 10.

Referring to FIG. 9, the time period $T_1$ is of the first timer 9, and the maximum consumption state $P_1$ measured in the time period $T_1$ is multiplied by a safety factor K (for example K=1.5), and thereby a reference consumption condition $M_2$ is attained. A consumption state $M_1$ is a reference consumption condition during the time period $T_1$, and is equal to the maximum consumption state. At a time $t_2$, the consumption state $M_1$ is compared with the reference consumption condition $M_2$, and the reference consumption condition $M_2$ of a lesser one is set as a new reference consumption condition. Subsequently, a lower reference consumption condition $L_2$ for forming a monitor range of the consumption state is calculated by the computing means 16, and an actual consumption state is monitored within the monitor range.

In the above-mentioned status, when an actual consumption state exceeds the reference consumption condition $M_2$, the consumption state judging means 8 detects an abnormal consumption state, and outputs a signal for activating the shutoff means 4.

At a time $t_3$, for example, a consumption state $P_2$ exceeds the reference consumption condition $L_2$ and is present in the monitor range. Then, a reference consumption condition $M_3$ is calculated by multiplying the consumption state $P_2$ by the safety factor K and is set as a provisional reference consumption condition. At the same time, operation of the second timer 13 is started, and the reference consumption condition $M_2$ is stored in the reference consumption state memory 5. A time period $T_{2-1}$ from the time $t_3$ to a time $t_4$ is the operation time period of the second timer 13. A monitor range during the time period $T_{2-1}$ is from the reference consumption condition $L_2$ to the reference consumption condition $M_3$, and the lower reference consumption condition is equal to the previous reference consumption condition $L_2$. In the time period $T_{2-1}$, a consumption state $P_2$ exists in the monitor range. In due time, operation of the second timer 13 finishes at the time $t_4$, and one number of operation of the second timer 13 is counted in the cycle counter 46. The second timer 13 is immediately restarted after finish of the operation at the time $t_4$, and is operated during a time period $T_{2-2}$ until a time $t_5$. A consumption state is monitored during the time period $T_{2-2}$. As shown in FIG. 9, a consumption state $P_3$ exists during the time period $T_{2-2}$.

Operation of the second timer 13 finishes at a time $t_5$, and one number of the operation of the second timer 13 is also counted in the cycle counter 46. Consequently, the number of operation counted in the cycle counter 46 becomes two. Furthermore, the second timer 13 is restarted after finish of the operation at the time $t_5$, and continues its operation during a time period $T_{2-3}$ until a time period $T_{2-3}$. When operation of the second timer 13 has finished at the time $t_6$, the cycle counter 47 counts one number of operation of the second timer 13, and as a result, the total operation number of the second timer 13 becomes three.

In the embodiment, in case that at least one consumption state is present in the monitor range during the respective operation time periods $T_{2-1}$, $T_{2-2}$ and $T_{2-3}$ of the second timer 13, the reference consumption condition is changed. In order to change the reference consumption condition, a new reference consumption condition $M_4$ is calculated by multiplying the maximum consumption state $P_4$ which is measured during the three operation time periods $T_{2-1}$, $T_{2-2}$ and $T_{2-3}$ by the safety factor K. Subsequently, in order to refine the monitor range, a lower reference consumption condition $L_4$ is calculated. In a similar manner, monitor of the consumption state is continued after the time $t_6$.

In the embodiment, it is a condition for amending the reference consumption condition that at least one consumption state is present in the monitor range during the respective time periods $T_{2-1}$, $T_{2-2}$ and $T_{2-3}$, and thereby, in case that the operation time of the second timer 13 is 24 hours, for example, variation of every day's consumption state can be monitored. Namely, when an increased consumption state has continued during three days, it is reasonable to suppose that a new gas equipment had introduced into the consumer. However, in the case that the increase of the consumption state is only temporary, such increased consumption state is not supposed to continue during three days. According to the above-mentioned manner, temporary increase of the gas consumption is distinguished from a successive increase because of introduction of the new gas equipment. Consequently, the reference consumption condition is not amended in such temporary increase. The number of operation of the second timer 13 can be selected to an arbitrary number corresponding to the consumer's condition.

Referring to FIG. 10, through a consumption state $P_3$ is in the monitor range during the time period $T_{2-1}$, no consumption state is present in the monitor range during the time period $T_{2-2}$. In the above-mentioned case, the reference consumption condition $M_3$ is replaced with the reference consumption condition $M_2$ which is equal to the preceding one. Namely, only the consumption state $P_3$ is present in the monitor range during the time period $T_{2\text{-}1}$ and no consumption state is present therein during the time period $T_{2\text{-}2}$. Therefore, the condition for changing the reference consumption condition is not completed in this case, and the reference consumption condition $M_2$ which is maintained in the reference consumption state memory 5 is reset in the changing means 12. Accordingly, the lower reference consumption condition $L_2$ is equal to the preceding lower reference consumption condition. In a similar manner, in case that no consumption state is present in the monitor range during the time period $T_{2\text{-}3}$, the original reference consumption condition $M_2$ is reset as the reference consumption condition.

In the above-mentioned example, though the upper reference consumption condition $M_n$ is calculated on the basis of a measured consumption state, the reference consumption condition can be selected from predetermined plural constant values.

Moreover, the reference consumption condition L of the monitor range is obtainable by multiplying the reference consumption condition $M_n$ by a predetermined factor (for example, 0.8). On the other hand, a predetermined constant value according to the reference consumption condition $M_n$ is applicable to the reference consumption condition $L_n$.

In the above-mention embodiment, when the gas consumption has temporarily increased, the reference consumption condition is replaced with a provisional reference consumption condition, and when the increase of the gas consumption has returned to the original state, the reference consumption condition is replaced with the original reference consumption condition. Thus, easy-going change of the reference consumption condition which invalidates the function of the gas shutoff apparatus is preventable.

Furthermore, in a similar manner as described in the first embodiment, a reference consumption condition S which is lower than the reference consumption condition L can be set to comply with reduction of gas consumption.

Figure 11:
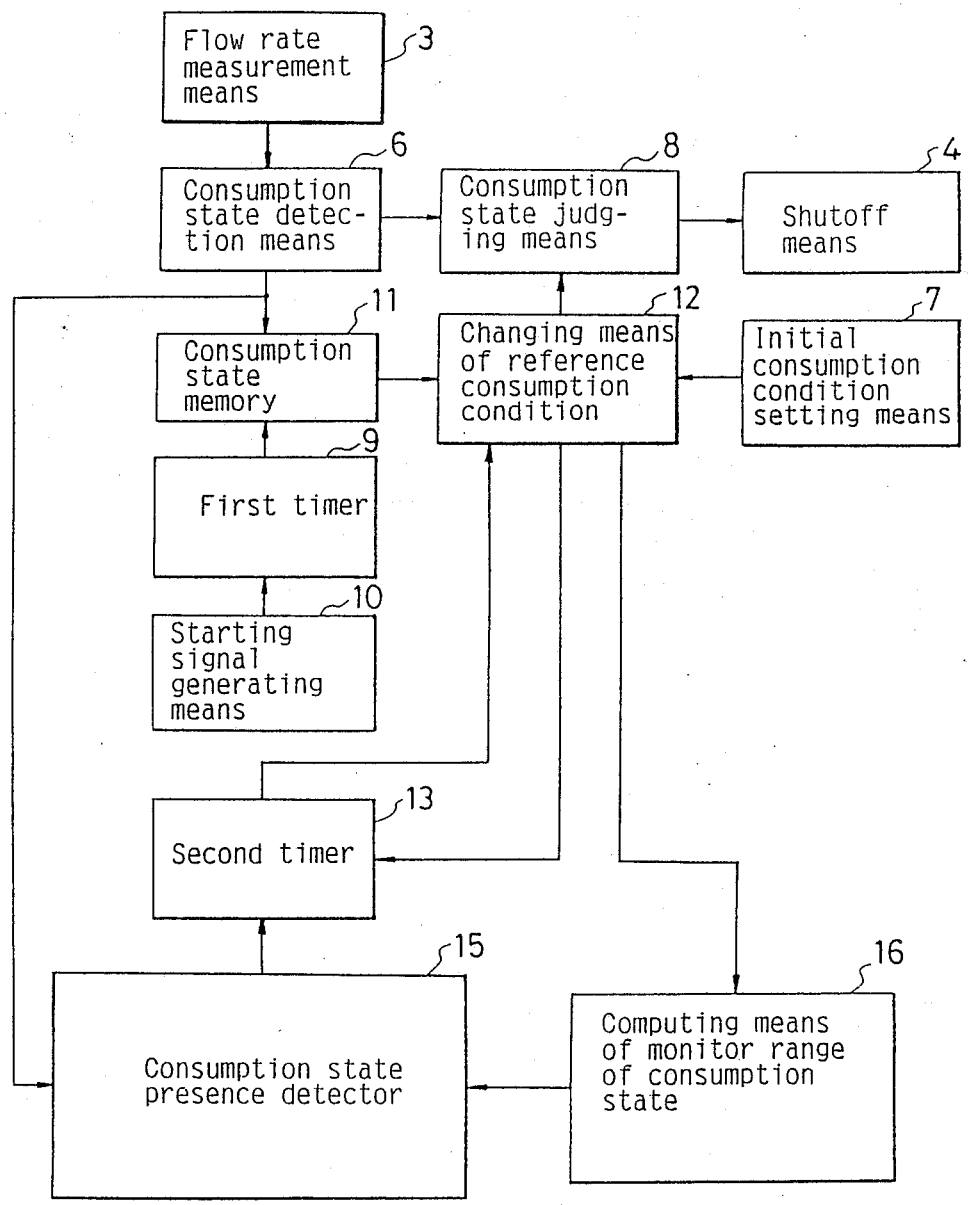
FIG. 11 is a block diagram of the gas shutoff apparatus of a third embodiment in accordance with the present invention.

FIG. 11 is a block diagram of a third embodiment of the gas shutoff apparatus, wherein elements similar to the elements of FIG. 2 are identified by like numerals. This embodiment relates to a process for lowering a reference consumption condition, and combination with the process of the first or second embodiment is recommendable in practical use.

Figure 12:
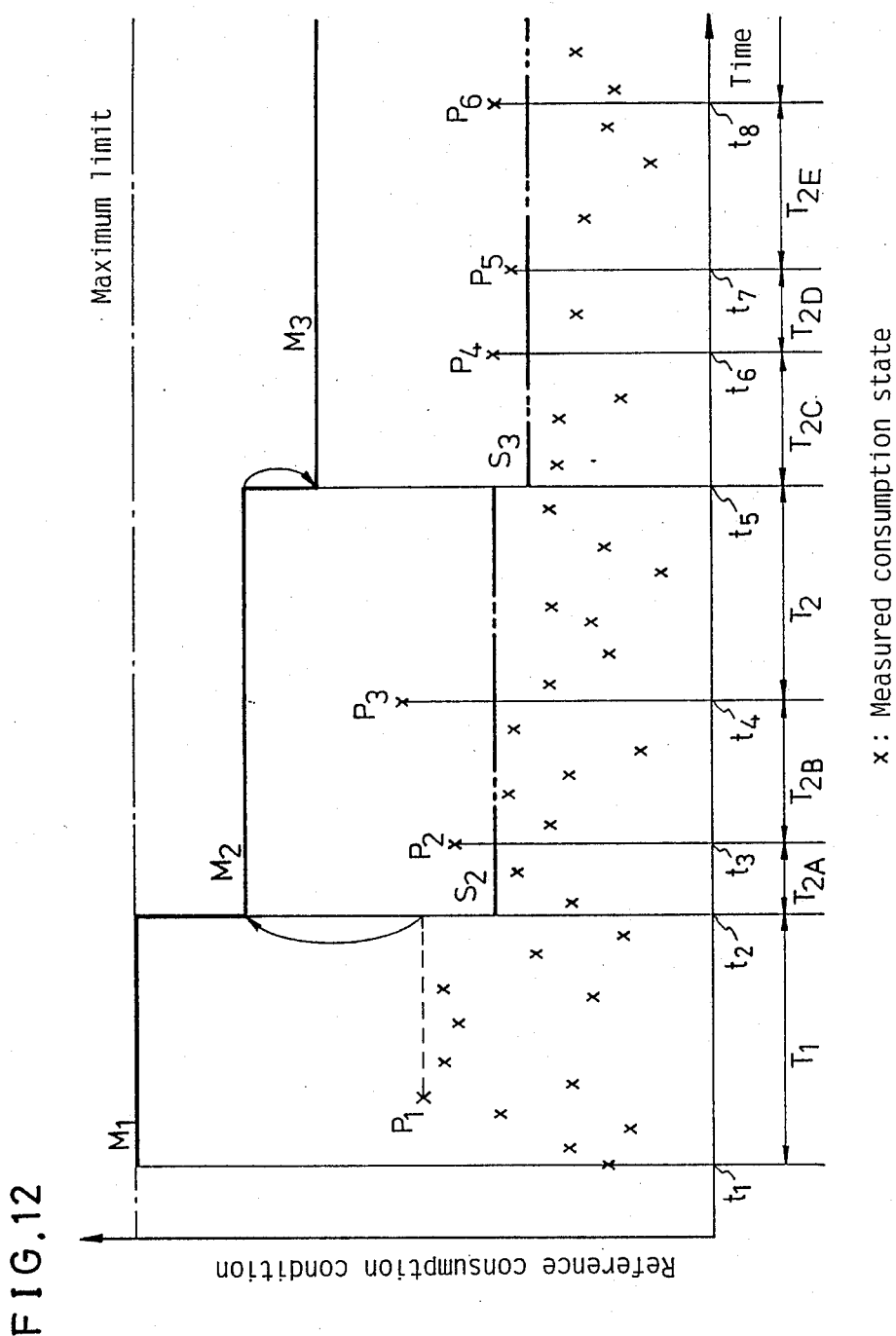
FIG. 12 is a graph of a reference consumption condition in the third embodiment.

FIG. 12 is a graph showing operation of the third embodiment. Referring to FIG. 12, the reference consumption condition $M_1$ is an initial consumption condition and is a maximum limit of consumption state. The maximum consumption state $P_1$ which is measured in the time period $T_1$ of the first timer 9 is multiplied by a safety factor K (for example K=1.5), and a reference consumption condition $M_2$ is attained. The reference consumption condition $M_2$ is compared with the initial reference consumption condition $M_1$ at the time $t_2$ which is end of operation of the first timer 9, and a lower reference consumption condition $M_2$ is set into the changing means 12 as a new reference consumption condition. Subsequently, in order to form a monitor range of the consumption state, a lower reference consumption condition $S_2$ is calculated, thus the monitor range is formed between the reference consumption conditions $M_2$ and $S_2$. In the above-mentioned status, when a gas consumption state exceeds the reference consumption condition $M_2$, an abnormal consumption state is detected by the consumption state judging means 8, and a shutoff signal is output.

The second timer 14 starts operation at the time $t_2$, and in case that a consumption state is present in the monitor range, operation of the second timer 14 is reset. Namely, counting operation of the second timer is interrupted, and the process is returned to the start. In the example, since a consumption state $P_2$ is present in the monitor range at the time $t_3$, at which the second timer 14 is reset. A time period $T_{24}$ is a time period between start and reset of the second timer 14. Then, the second timer 14 starts operation at the time $t_3$, and a consumption state $P_3$ is present in the monitor range at a time $t_4$ to interrupt operation of the second timer. Consequently, the second timer is again reset, and is started at a time $t_4$.

During the time period from the time $t_4$ to a time $t_5$, since no consumption state is present in the monitor range, operation of the second timer 13 is not suspended, and thus the second timer 13 finishes the operation at the time $t_5$. Then at the time $t_5$, a new reference consumption condition $M_3$ is calculated by multiplying the preceding reference consumption condition $M_2$ by a predetermined factor d (for example d=0.8). Subsequently, a new lower reference consumption condition $S_3$ is calculated by the computing means 16 of the monitor range of consumption state.

The second timer 13 is operated in the similar manner as mentioned above after the time $t_5$, and in case that a consumption state such as a consumption state $P_4$, $P_5$ or $P_6$ comes in the monitor range within the time period $T_2$ of the second timer 13, the present monitor range between the reference consumption conditions $M_3$ and $S_3$ is maintained. On the other hand, in case that no consumption state exists in the monitor range during the time period $T_2$, the present monitor range is replaced with a new lower monitor range. Therefore, the third embodiment relates to function for lowering a reference consumption condition.

Figure 13:
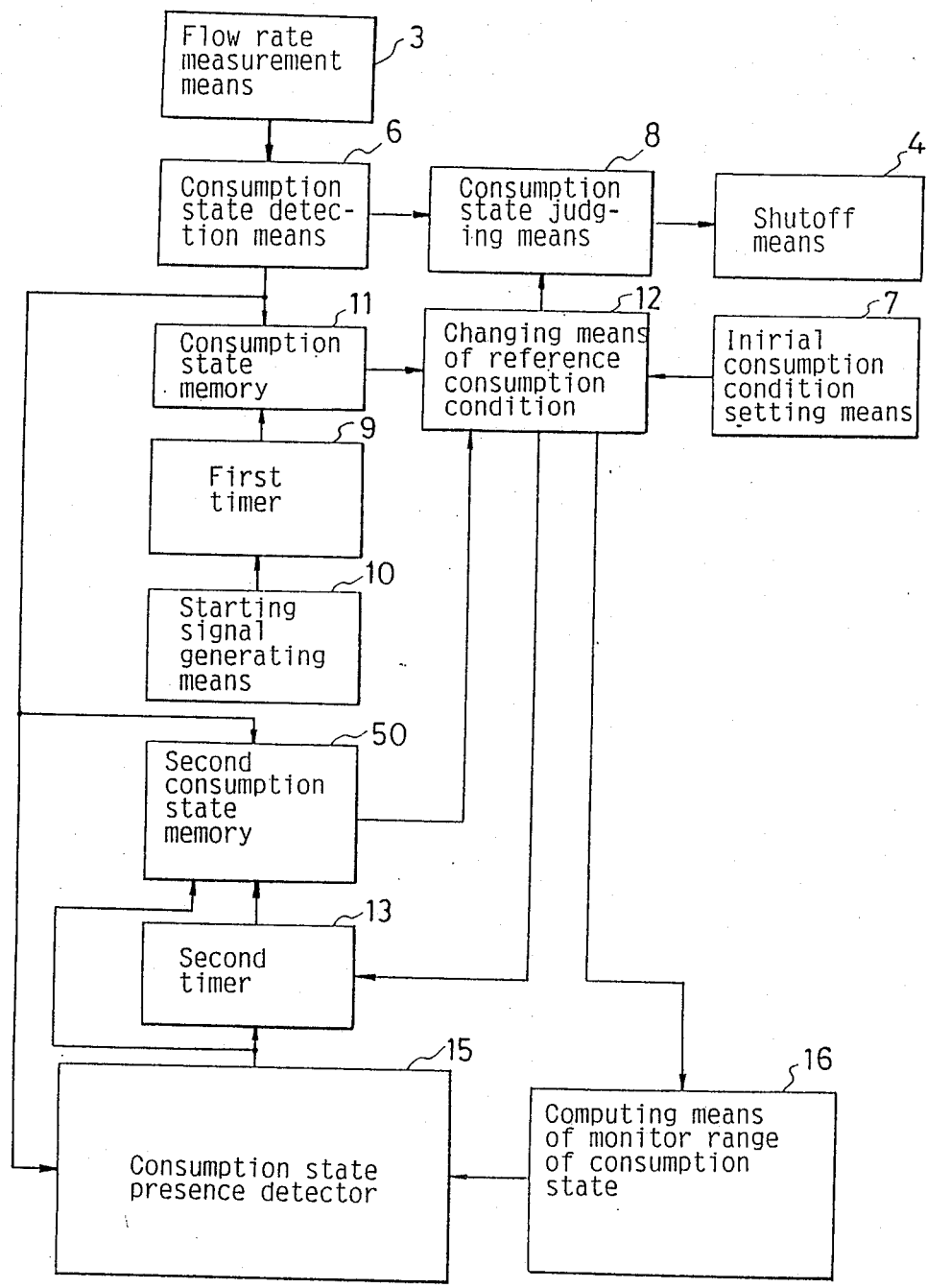
FIG. 13 is a block diagram of the gas shutoff apparatus of a fourth embodiment in accordance with the present invention.

FIG. 13 is a block diagram of a fourth embodiment of the gas shutoff apparatus, wherein elements similar to the elements of FIG. 2 are identified by like numerals. In the embodiment, a second consumption state memory 50 is provided instead of the computing means 14 of FIG. 2 with respect to the first embodiment. The fourth embodiment also relates to a process for lowering a reference consumption condition, and the process is recommendable to combine with the process of the first or second embodiment.

The second consumption state memory 50 stores a consumption state during operation of the second timer 13, and calculates a reference consumption condition on the basis of the consumption state memorized in the second consumption state memory 50. The consumption state presence detector 15 detects presence of a consumption state in a monitor range which is formed by the computing means 16, and when the consumption state is present in the monitor range, data of the second consumption state memory 50 is initialized, and the second timer 13 is reset. An upper reference consumption condition of the monitor range is replaced with a consumption state from the second consumption memory 50 when the operation of the second timer 13 finished.

Figure 14:
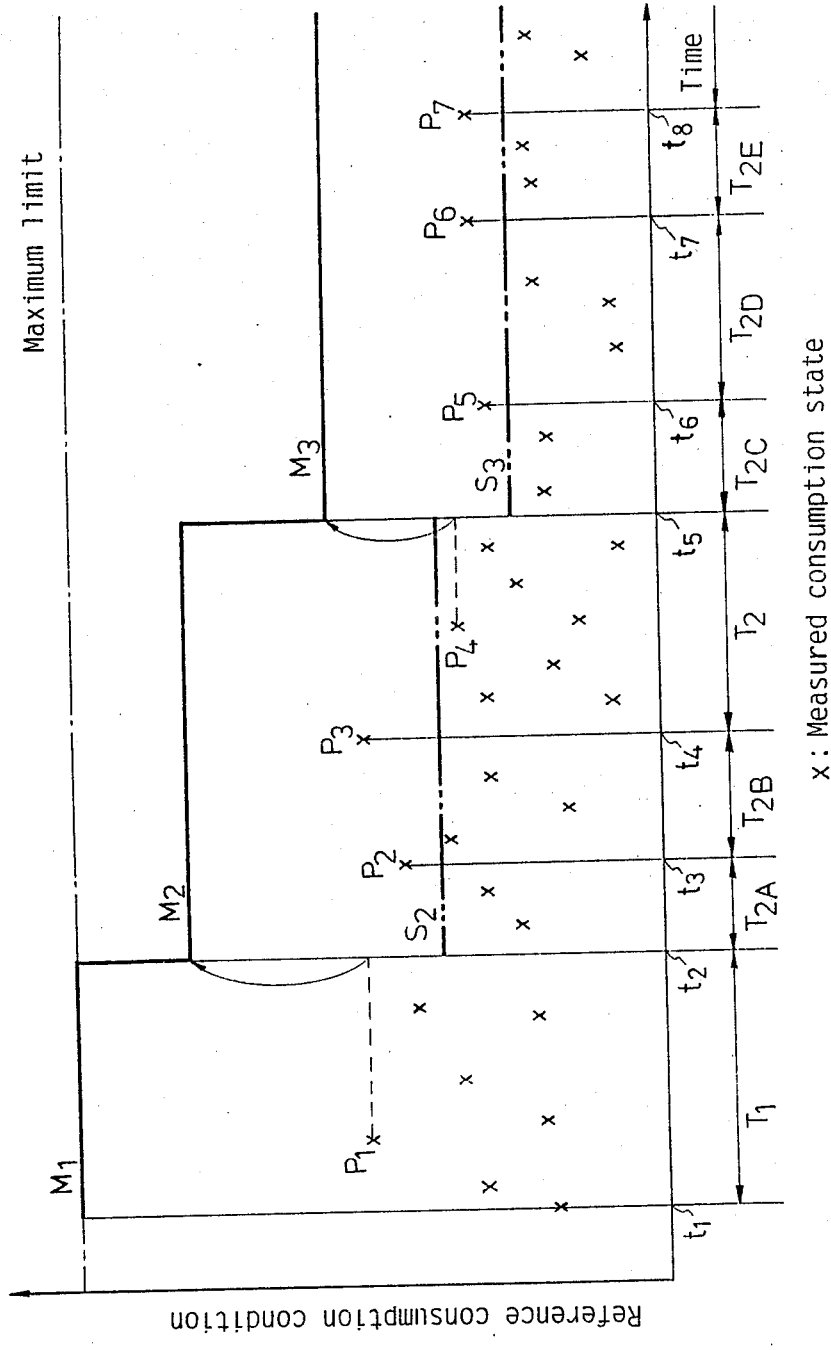
FIG. 14 is a graph of a reference consumption condition in the fourth embodiment.

Detailed operation of the fourth embodiment is elucidated in reference with FIG. 14. Operation between the times $t_1$ and $t_4$ is identical with that of the third embodiment. In this embodiment, a consumption state is stored by the second consumption state memory 50 during the time period $T_2$ of the second timer 13. After operation of the second timer 13 is completed at the time $t_5$, a consumption state $P_4$ which is maximum between the times $t_4$ and $t_5$ is selected and is multiplied by the safety factor K, and thereby a new reference consumption condition $M_3$ is obtained. After the time $t_5$, operation of the second timer 13 is restarted. However, since consumption states $P_5$, $P_6$ and $P_7$ is present in the monitor range, the second timer 13 is reset at the respective times $t_6$, $t_7$ and $t_8$. The respective operation time periods $T_{2C}$, $T_{2D}$ and $T_{2E}$ are shorter than the full operation time of the second timer 13.

In the fourth embodiment, which is unlike the third embodiment, a new upper reference consumption condition is calculated on the basis of the maximum consumption state which is present in the monitor range in preceding time period $T_2$ of the second timer 13.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A gas shutoff apparatus for interrupting a gas supply in a gas supply line, comprising:

flow rate measurement means for generating a flow rate signal corresponding to a flow rate of said gas in said gas supply line, consumption state detection means for detecting a consumption state shown by said flow rate and a consumption time of the gas on the basis of said flow rate signal, initial consumption condition setting means for setting a reference consumption condition as an initial condition, consumption state judging means comprising means for comparing said detected consumption state with said reference consumption condition and means for generating a gas shutoff signal when said consumption state is in excess of said reference consumption condition, a first timer for measuring a first predetermined time period, starting signal generating means for starting operation of said first timer, consumption state memory for storing said output consumption state by said consumption state detection means during a time period of operation of said first timer and comprising means for calculating a consumption condition on the basis of said stored consumption state, means for changing said reference consumption condition in accordance with said calculated consumption condition, means for computing a monitor range of said consumption condition output by said changing means, a second timer for measuring a second predetermined time period, means for computing a provisional reference consumption condition and setting said provisional reference consumption condition into said means for changing said reference consumption condition on the basis of an output of said consumption state detection means, a consumption state presence detector for detecting an occurrence of said consumption state within said monitor range, for outputting a signal for starting operation of said second timer at said occurrence of said consumption state, for storing a consumption state which is present in said monitor range during operation of said second timer, and for calculating and outputting to said changing means a new reference consumption condition on the basis of said consumption state stored by said consumption state presence detector, and shutoff means for interrupting said gas supply by reception of said shutoff signal.

2. A gas shutoff apparatus for interrupting a gas supply in a gas supply line, comprising:

flow rate measurement means for generating a flow rate signal corresponding to a flow rate of said gas in said gas supply line, consumption state detection means for detecting a consumption state shown by said flow rate and a consumption time of the gas on the basis of said flow rate signal, initial consumption condition setting means for setting a reference consumption condition as an initial condition, consumption state judging means comprising means for comparing said detected consumption state with said reference consumption condition and means for generating a gas shutoff signal when said consumption state is in excess of said reference consumption condition, a first timer for measuring a first predetermined time period, starting signal generating means for starting operation of said first timer, consumption state memory for storing said consumption state output by said consumption state detection means during a time period of operation of said first timer and comprising means for calculating a consumption condition on the basis of said stored consumption state, means for changing said reference consumption condition in accordance with said calculated consumption condition, means for computing a monitor range of said consumption condition output by said changing means, a second timer for measuring a second predetermined time period, a cycle counter for counting a cycle number of operation of said second timer, means for computing a provisional reference consumption condition comprising means for setting said provisional reference consumption condition into said changing means on the basis of an output of said consumption state detection means, shutoff means for interrupting said gas supply by said shutoff signal, and a consumption state presence detector for detecting an occurrence of said consumption state within said monitor range, for outputting a signal for starting operation of said second timer at said occurrence of said consumption state until said cycle number of operation of said second timer reaches a predetermined number, for storing a consumption state which is present in said monitor range during each cycle of operation of said second timer, and for calculating and outputting to said changing means a reference consumption condition to be set in said changing means on the basis of said consumption state stored by said consumption state presence detector.

3. A gas shutoff apparatus for interrupting a gas supply in a gas supply line, comprising:

flow rate measurement means for generating a flow rate signal corresponding to a flow rate of said gas in said gas supply line, consumption state detection means for detecting a consumption state shown by said flow rate and a consumption time of the gas on the basis of said flow rate signal, initial consumption condition setting means for setting a reference consumption condition as an initial condition, consumption state judging means comprising means for comparing said detected consumption state with said reference consumption condition and means for generating a gas shutoff signal when said consumption state is in excess of said reference consumption condition, a first timer for measuring a first predetermined time period, starting signal generating means for starting operation of said first timer, consumption state memory for storing said consumption state output by said consumption state detection means during a time period of operation of said first timer and comprising means for calculating a consumption condition on the basis of said stored consumption state, means for changing said reference consumption condition in accordance with said calculated consumption condition, means for computing a monitor range of said consumption condition output by said changing means, a second timer for measuring a second predetermined time period, a consumption state presence detector for detecting an occurrence of said consumption state within said monitor range, for outputting a signal for starting operation of said second timer at said occurrence of said consumption state, for storing a consumption state which is present in said monitor range during operation of said second timer, and for calculating and outputting to said changing means a reference consumption condition to be set in said changing means after completion of operation of said second timer on the basis of said stored consumption state stored by said consumption state presence detector, and shutoff means for interrupting said gas supply by reception of said shutoff signal.

4. A gas shutoff apparatus in accordance with claim 3, wherein the reference consumption condition is multiplied by a predetermined factor at the time of finish of operation of said second timer.

5. A gas shutoff apparatus for interrupting a gas supply in a gas supply line, comprising:

flow rate measurement means for generating a flow rate signal corresponding to a flow rate of said gas in said gas supply line, consumption state detection means for detecting a consumption state shown by said flow rate and a consumption time of the gas on the basis of said flow rate signal, initial consumption condition setting means for setting a reference consumption condition as an initial condition, consumption state judging means comprising means for comparing said detected consumption state with said reference consumption condition and means for generating a gas shutoff signal when said consumption state is in excess of said reference consumption condition, a first timer for measuring a first predetermined time period, starting signal generating means for starting operation of said first timer, a first consumption state memory for storing said consumption state output by said consumption state detection means during a time period of operation of said first timer and comprising means for calculating a consumption condition on the basis of said stored consumption state, means for changing said reference consumption condition in accordance with said calculated consumption condition, means for computing a monitor range of said consumption condition output by said changing means, a second timer for measuring a second predetermined time period, a second consumption state memory for storing said consumption state during a time period of operation of said second timer and comprising means for calculating a new consumption condition on the basis of said consumption state stored in said second consumption state memory, and means for setting a reference consumption condition in said means for changing said reference consumption condition on the basis of said new consumption condition calculated by said second consumption state memory after finish of operation of said second timer, a consumption state presence detector for detecting an occurrence of said consumption state within said monitor range, for outputting a signal for restarting operation of said second timer at said occurrence of said consumption state, and for initializing said second consumption state memory at said occurrence of said consumption state, and shutoff means for interrupting said gas supply by reception of said shutoff signal.

* * * * *

UNITED STATES PATENT AND TRADEMARK OFFICE
CERTIFICATE OF CORRECTION

PATENT NO. : 4,928,728

DATED : May 29, 1990

INVENTOR(S) : Shinichi Nakane, Takashi Uno, Hiroshi Horii, Shinzo Kato, Mitsuo Namba, Reppei Uematsu It is certified that error appears in the above-identified patent and that said Letters Patent is hereby corrected as shown below:

On the Title page:

The fourth inventor should read -- Shinzo Kato --

Signed and Sealed this

Thirteenth Day of August, 1991

Attest:

HARRY F. MANBECK, JR.

Attesting Officer

Commissioner of Patents and Trademarks